United States Patent
Hong

(10) Patent No.: US 10,427,987 B2
(45) Date of Patent: Oct. 1, 2019

(54) ORGANIC FERTILIZER FOR VEGETABLES AND ITS PREPARATION METHOD

(71) Applicant: Xiong Bing Hong, Temple City, CA (US)

(72) Inventor: Xiong Bing Hong, Temple City, CA (US)

( * ) Notice: Subject to any disclaimer, the term of this patent is extended or adjusted under 35 U.S.C. 154(b) by 191 days.

(21) Appl. No.: 15/593,080

(22) Filed: May 11, 2017

(65) Prior Publication Data

US 2018/0327330 A1 Nov. 15, 2018

(51) Int. Cl.
*C05D 9/00* (2006.01)
*C05F 17/00* (2006.01)

(52) U.S. Cl.
CPC ............ *C05F 17/0036* (2013.01); *C05D 9/00* (2013.01); *C05F 17/0027* (2013.01); *C05F 17/0045* (2013.01)

(58) Field of Classification Search
CPC .............. C05F 17/0036; C05F 17/0045; C05F 17/0027; C05D 9/00
See application file for complete search history.

(56) References Cited

FOREIGN PATENT DOCUMENTS

CN 105315021 A * 2/2016

OTHER PUBLICATIONS

Hall, Megen. "Companion Planting—Utilize nature's diversity to improve the health of your garden". <https://www.highmowingseeds.com/blog/companion-planting-utilize-natures-diversity-to-improve-the-health-of-your-garden/> Mar. 17, 2016.*

* cited by examiner

*Primary Examiner* — Jennifer A Smith
(74) *Attorney, Agent, or Firm* — Elizabeth Yang

(57) ABSTRACT

The present invention provides an organic fertilizer and its method of preparation. The fertilizer is an okra based organic fertilizer comprises sterilized mature okra fruits, a colloidal fluid of bacilli, 10-15 fractions of chicken droppings, 20-25 fractions of soybean residuals, 10-15 fractions of plant ashes and 45-60 fractions of water. The fertilizer can condition the soil, increase the activity of microorganisms in the soil and facilitate to increase the biomass in an individual vegetable by more than 10%; it can contain the growth of the vegetable germs and effectively control various pathogenic bacteria harmful to flowers to significantly improve the vegetable quality with the use of pesticide to less than 90%. This organic fertilizer is applicable to plantation of vegetables or fruits, cereal crops and flowers with a broad application.

1 Claim, No Drawings

ORGANIC FERTILIZER FOR VEGETABLES AND ITS PREPARATION METHOD

FIELD OF THE INVENTION

The present invention relates generally to an okra based organic fertilizer for vegetables and its method of preparation and more particularly the invention relates to an anaerobic bacteria fermented okra based organic fertilizer for vegetables and its method of preparation.

BACKGROUND OF THE INVENTION

The fertilizer is a very important means of production in crop plantation, which plays a great part in the process of cultivation and management of vegetables. Currently, major fertilizers used in the production bases of vegetables all over the world are compound fertilizers and chemical fertilizers with small amount of organic fertilizers. Although, the chemical fertilizer has a quick effect, its leaching loss is serious and the young plant can be burnt as a result of improper fertilization. A long-term application may harden the soil and lower the effect of the fertilizer while it's physical and chemical properties become worse, posing an impact on the quality of vegetables to some extent. At present, chemical fertilizers are prohibited in compliance with the requirements for a green agriculture. For example, no chemical fertilizer is allowed to be directly applied to the soil in the developed countries for the environmental protection. While organic fertilizers (i.e., bean cake fertilizers, feces) play a ground-breaking role in the development of vegetable produce, there are some noticeable problems in terms of its process of preparation and treatment of nutrients and pathogens. Therefore, to facilitate the development of the vegetable industry with high-yield, quality, cost-effectiveness and environmental friendliness, there is a felt need for the development of a novel organic fertilizer.

Numerous innovations have been provided in prior art that are adapted to organic fertilizer. Even though these innovations may be suitable for the specific purposes to which they address, however, they would not be as suitable for the purposes of the present invention.

It is apparent now that numerous innovations for organic fertilizer and its method and preparation have been developed in the prior art that are adequate for various purposes. Furthermore, even though these innovations may be suitable for the specific purposes to which they address, accordingly, they would not be suitable for the purposes of the present invention as heretofore described. Thus an anaerobic bacteria fermented okra based organic fertilizer for vegetables and its method of preparation is needed.

SUMMARY OF THE INVENTION

The present invention relates to a novel organic fertilizer and its method of preparation. The product prepared by this method can condition the soil, increase the activity of microorganisms in the soil and facilitate to increase the biomass in an individual vegetable by more than 10%; it can contain the growth of the vegetable germs and effectively control various pathogenic bacteria harmful to flowers to significantly improve the vegetable quality with the use of pesticide to less than 90%. This organic fertilizer is applicable to plantation of vegetables or fruits, cereal crops and flowers with a broad application and it has a prospect for commercial production.

The present invention discloses about an organic fertilizer and its method of preparation. Wherein the fertilizer is an okra based organic fertilizer comprises sterilized mature okra fruits, a colloidal fluid of bacilli, 10-15 fractions of chicken droppings, 20-25 fractions of soybean residuals, 10-15 fractions of plant ashes and 45-60 fractions of water.

In view of the foregoing, it is therefore an object of the present invention to provide an anaerobic bacteria fermented okra based organic fertilizer for vegetables and its method of preparation.

It is another object of the present invention to provide an organic fertilizer, which can increase the activity of microorganisms in the soil and facilitate to increase the biomass in an individual vegetable by more than 10%.

It is another object of the present invention to provide an organic fertilizer that can enhance the growth of the vegetable germs and effectively control various pathogenic bacteria harmful to flowers to significantly improve the vegetable quality with the use of pesticide to less than 90%.

Other features and aspects of the invention will become apparent from the following detailed description, by way of example, the features in accordance with embodiments of the invention. The summary is not intended to limit the scope of the invention, which is defined solely by the claims attached hereto.

DETAILED DESCRIPTION OF THE INVENTION

The following detailed description is merely exemplary in nature and is not intended to limit the described embodiments or the application and uses of the described embodiments. As used herein, the word "exemplary" means "serving as an example or instance." Any implementation described herein as "exemplary" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, there is no intention to be bound by any expressed or implied theory presented in the preceding technical field, background, brief summary or the following detailed description. It is also to be understood that the specific compound and processes described in the following specification, are simply exemplary embodiments of the inventive concepts defined in the appended claims. Specific examples and other characteristics relating to the embodiments disclosed herein are therefore not to be considered as limiting, unless the claims expressly state otherwise.

In one embodiment of the invention, the present invention discloses about an organic fertilizer and its method of preparation. Wherein the fertilizer is okra based organic fertilizer comprises sterilized mature okra fruits, a colloidal fluid of bacilli, chicken droppings, soybean residuals, plant ashes and water.

In another embodiment of the invention, the organic fertilizer comprises 10 to 15 fractions of chicken droppings.

In another embodiment of the invention, the organic fertilizer comprises 20 to 25 fractions of soybean residuals.

In another embodiment of the invention, the organic fertilizer comprises 10 to 15 fractions of plant ashes.

In another embodiment of the invention, the organic fertilizer comprises 45 to 60 fractions of water.

In another embodiment of the invention, the invention discloses about a method of preparation of an organic fertilizer for vegetables, wherein the method comprises the following steps of, picking mature okra fruits then washing and sterilizing the okra fruits, anaerobic depositing of the sterilized okra fruits for 3 to 5 days at temperature range of 18 to 25 degree C. to obtain matrix of the organic fertilizer for vegetables; adding 1 part of strain I to 0.85 to 0.95 part of the matrix of the organic fertilizer to obtain a first fluid of the organic fertilizer for vegetables by an anaerobic fermentation for 120-180 days under hermetic closure, shading and sterilization at temperature of 20 to 35 degree C.; adding 1 part of strain II to 0.95 to 0.98 part of the matrix of the organic fertilizer for vegetables to obtain a second fluid of the organic fertilizer for vegetables by an anaerobic fermentation for 30-60 days under hermetic closure, shading and sterilization at temperature 20 to 35 degree C.; and adding 5 to 10 fractions of the second fluid of the organic fertilizer for vegetables to a mixture of 10 to 15 fractions of chicken droppings, 20 to 25 fractions of soybean residuals, 10 to 15 fractions of plant ashes and 45 to 60 fractions of water followed by standing for 30 to 60 days at temperature of 20 to 35 degree C. to obtain the organic fertilizer for vegetables.

In another embodiment of the present invention, the stain I and stain II used in the method of preparation of an organic fertilizer comprises a colloidal fluid of bacilli.

In another embodiment of the present invention, the organic fertilizer prepared by this method can condition the soil, increase the activity of microorganisms in the soil and facilitate to increase the biomass in an individual vegetable by more than 10%; it can contain the growth of the vegetable germs and effectively control various pathogenic bacteria harmful to flowers to significantly improve the vegetable quality with the use of pesticide to less than 90%. This organic fertilizer is applicable to plantation of vegetables or fruits, cereal crops and flowers with a broad application and it has a prospect for commercial production.

These and other advantages of the invention will be further understood and appreciated by those skilled in the art by reference to the following written specification and claims.

Because many modifications, variations, and changes in detail can be made to the described preferred and exemplary embodiments of the invention, it is intended that all matters in the foregoing description be interpreted in a limiting sense. Thus, the scope of the invention should be determined by the appended claims and their legal equivalence.

What is claimed is:

1. A method of preparation of an organic fertilizer for vegetables comprising:

picking mature okra fruits then washing and sterilizing the okra fruits;

anaerobic depositing of the sterilized okra fruits for 3 to 5 days at a temperature range of 18 to 25 degree C. to obtain a matrix of the organic fertilizer for vegetables;

adding 1 part of a colloidal fluid of *Bacillus* to 0.95 to 0.98 part of the matrix of the organic fertilizer for vegetables to obtain a second fluid of the organic fertilizer for vegetables by an anaerobic fermentation for 30-60 days under hermetic closure, shading and sterilization at temperature 20 to 35 degree C.; and adding 5 to 10 fractions of the second fluid of the organic fertilizer for vegetables to a mixture of 10 to 15 fractions of chicken droppings, 20 to 25 fractions of soybean crop waste, 10 to 15 fractions of plant ashes and 45 to 60 fractions of water followed by standing for 30 to 60 days at temperature of 20 to 35 degree C. to obtain the organic fertilizer for vegetables.

* * * * *